(12) United States Patent
Honda et al.

(10) Patent No.: US 8,581,199 B2
(45) Date of Patent: Nov. 12, 2013

(54) SOLID STATE IMAGING DEVICE

(75) Inventors: Hiroto Honda, Kanagawa-ken (JP); Hideyuki Funaki, Tokyo (JP); Honam Kwon, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 13/247,025

(22) Filed: Sep. 28, 2011

(65) Prior Publication Data

US 2012/0228506 A1 Sep. 13, 2012

(30) Foreign Application Priority Data

Mar. 9, 2011 (JP) .................................. 2011-051274

(51) Int. Cl.
*G01T 1/24* (2006.01)

(52) U.S. Cl.
USPC .................................. 250/370.08; 250/338.4

(58) Field of Classification Search
USPC .............. 250/330, 332, 338.1, 338.4, 339.02, 250/370.08
See application file for complete search history.

(56) References Cited

FOREIGN PATENT DOCUMENTS

| JP | 2004-364241 A | 12/2004 |
|---|---|---|
| JP | 2007-534952 A | 11/2007 |
| JP | 2008-268155 | 11/2008 |
| JP | 2009-44135 A | 2/2009 |
| JP | 2009-218682 A | 9/2009 |
| JP | 2010-216833 A | 9/2010 |
| WO | WO 2011/013197 A1 | 2/2011 |
| WO | WO 2011013197 A1 * | 2/2011 |

OTHER PUBLICATIONS

J.L. Tissot, et al., "High Performance Uncooled Amorphous Silicon VGA IRFPA with 17 μm Pixel-Pitch", Proc. of SPIE, vol. 7660 76600T-1, 2010, 7 pages.
U.S. Appl. No. 13/050,512, filed Mar. 17, 2011, Kwon et al.
U.S. Appl. No. 13/728,009, filed Dec. 27, 2012, Honda.
Office Action issued Feb. 28, 2013, in Japanese Patent Application No. 2011-051274 with English translation.

* cited by examiner

*Primary Examiner* — Mark R Gaworecki
(74) *Attorney, Agent, or Firm* — Oblon, Spivak, McClelland, Maier & Neustadt, L.L.P.

(57) ABSTRACT

According to one embodiment, a solid state imaging device includes an infrared detection pixel configured to change an output potential by receiving infrared light, a non-sensitive pixel, a row select line, and a differential amplifier. An amount of change in an output potential when the non-sensitive pixel receives infrared light is smaller than an amount of change in an output potential when the infrared detection pixel receives the infrared light. The row select line is configured to apply a drive potential to both the infrared detection pixel and the non-sensitive pixel. The differential amplifier includes one input terminal to which an output potential of the infrared detection pixel is inputted and another input terminal to which an output potential of the non-sensitive pixel is inputted.

20 Claims, 9 Drawing Sheets

SOLID STATE IMAGING DEVICE

CROSS-REFERENCE TO RELATED APPLICATIONS

This application is based upon and claims the benefit of priority from the prior Japanese Patent Application No. 2011-051274, filed on Mar. 9, 2011; the entire contents of which are incorporated herein by reference.

FIELD

Embodiments described herein relate generally to a solid state imaging device.

BACKGROUND

Infrared light has longer wavelengths than visible light, and is therefore less easily scattered than visible light. Hence, infrared light has the advantage of being highly transmitted through smoke and fog. Furthermore, since heat sources such as living things and the like emit infrared light, they can be imaged even at night by using infrared light. At this time, since infrared light is not seen by the eye, even if an object is lit by infrared light at night, photographing can be performed without being noticed by the object. Furthermore, if the infrared light emitted from substances and living things serving as heat sources is detected and photographed, the temperature information of the objects can be obtained. Because of such characteristics, imaging utilizing infrared light is widely used from defense areas to surveillance cameras, fire detection cameras, and the like.

These days, "uncooled infrared solid state imaging devices" that do not need a cooling mechanism are actively developed. A uncooled, that is, heat-based infrared solid state imaging device converts incident infrared light with wavelengths around 10 μm into heat using an absorption structure, then uses some kind of thermoelectric conversion means to convert the temperature change of a thermo-sensitive unit caused by this weak heat into an electric signal, and reads out the electric signal to obtain infrared image information.

For example, there is a solid state imaging device using a p-n junction of silicon in which a constant forward current is given to convert a temperature change into a voltage change. The solid state imaging device has the advantage that an SOI (silicon on insulator) substrate can be used as a semiconductor substrate to allow mass production using manufacturing processes for LSIs (large scale integrated circuits) of silicon. Furthermore, even in the case where a large number of infrared detection pixels are arranged in a matrix configuration and connected to a common interconnection, the rectifying properties of the p-n junction that is a thermoelectric conversion means can be utilized to obtain the function of row selection. Therefore, the solid state imaging device has also the advantage that pixels can be configured to be very simple.

One indicator of the performance of the solid state imaging device is the noise equivalent temperature difference (NETD, hereinafter referred to as "NETD"), which expresses the temperature resolution of the solid state imaging device. Reducing the NETD, that is, reducing the temperature difference of the solid state imaging device corresponding to noise is important in improving the sensitivity of the solid state imaging device.

BRIEF DESCRIPTION OF THE DRAWINGS

FIG. 3A is a plan view by line B-B' shown in FIG. 3B, and FIG. 3B is a cross-sectional view taken along line A-A' shown in FIG. 3A;

FIG. 5A is a plan view by line B-B' shown in FIG. 5B, and FIG. 5B is a cross-sectional view taken along line A-A' shown in FIG. 5A;

DETAILED DESCRIPTION

Figure 1:
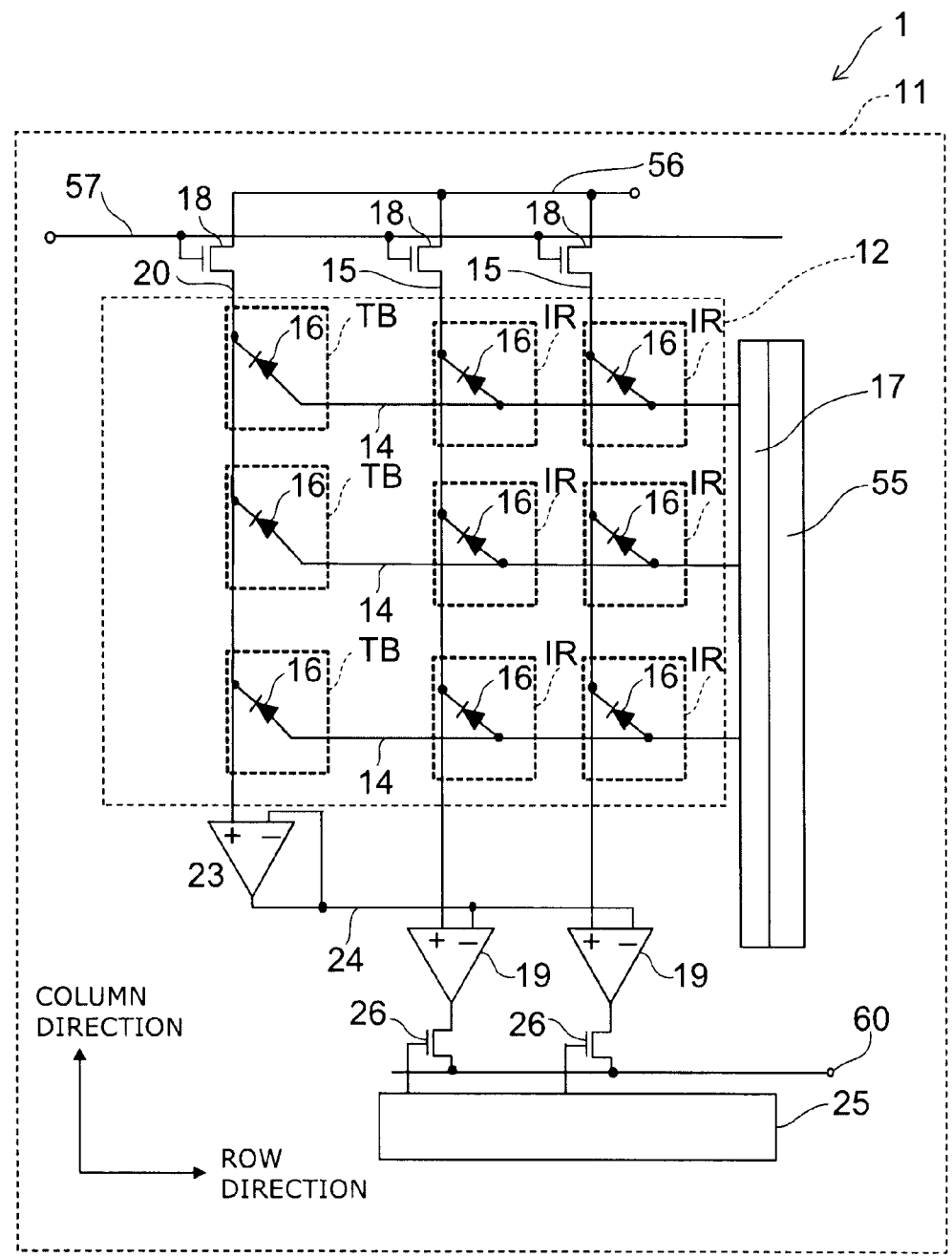
FIG. 1 is a circuit diagram illustrating a solid state imaging device according to a first embodiment.

In general, according to one embodiment, a solid state imaging device includes an infrared detection pixel configured to change an output potential by receiving infrared light, a non-sensitive pixel, a row select line, and a differential amplifier. An amount of change in an output potential when the non-sensitive pixel receives infrared light is smaller than an amount of change in an output potential when the infrared detection pixel receives the infrared light. The row select line is configured to apply a drive potential to both the infrared detection pixel and the non-sensitive pixel. The differential amplifier includes one input terminal to which an output potential of the infrared detection pixel is inputted and another input terminal to which an output potential of the non-sensitive pixel is inputted. The differential amplifier is configured to output an electric potential corresponding to a difference between an electric potential inputted to the one input terminal and an electric potential inputted to the other input terminal. The infrared detection pixel, the non-sensitive pixel, and the differential amplifier are formed in the same semiconductor substrate.

According to another embodiment, a solid state imaging device includes an infrared detection pixel configured to change an output potential by receiving infrared light, a non-sensitive pixel, a first row select line, a second row select line, a drive circuit, a vertical signal line connected to both the infrared detection pixel and the non-sensitive pixel, a first load transistor, and a correlated double sampling circuit. An amount of change in an output potential when the non-sensitive pixel receives infrared light is smaller than an amount of change in an output potential when the infrared detection pixel receives the infrared light. The first row select line is connected to the non-sensitive pixel and configured to apply a drive voltage to the non-sensitive pixel. The second row select line is connected to the infrared detection pixel and configured to apply a drive potential to the infrared detection pixel. The drive circuit is provided on the semiconductor substrate and configured to sequentially select the first and second row select lines to apply the drive potential. The first load transistor is provided in the semiconductor substrate.

The first load transistor is connected to one end of the vertical signal line, and configured to pass a constant current. The correlated double sampling circuit is connected to another end of the vertical signal line and configured to keep a first potential inputted when the first row select line is selected and to output an electric potential corresponding to a difference between the first potential and a second potential inputted when the second row select line is selected. The infrared detection pixel, the non-sensitive pixel, and the correlated double sampling circuit are formed in the same semiconductor substrate.

Various embodiments will be described hereinafter with reference to the accompanying drawings.

(First Embodiment)

Hereinbelow, embodiments of the invention are described with reference to the drawings.

First, a first embodiment is described.

This embodiment is an embodiment of the solid state imaging device.

FIG. 1 is a circuit diagram illustrating a solid state imaging device according to the first embodiment.

First, the configuration of the solid state imaging device according to the first embodiment is described.

As shown in FIG. 1, a solid state imaging device 1 is provided in a semiconductor substrate 11. An imaging region 12 is defined in the solid state imaging device 1. In the imaging region 12, a plurality of row select lines 14 extending in the row direction (a first direction) and a plurality of vertical signal lines 15 extending in a direction intersecting with the row direction, for example the column direction (a second direction) orthogonal thereto, are provided in a lattice configuration. Furthermore, one reference potential line 20 extending in the column direction is provided in the imaging region 12. The reference potential line 20 is placed on the outside of the region where the plurality of vertical signal lines 15 described above are provided.

In the imaging region 12, a plurality of infrared detection pixels IR (infrared) and a plurality of non-sensitive pixels TB (thermal black) are provided. The infrared detection pixel IR is disposed at the intersection of each row select line 14 and each vertical signal line 15. The non-sensitive pixel TB is disposed at the intersection of each row select line 14 and the reference potential line 20. A p-n diode 16 is provided in the infrared detection pixel IR and the non-sensitive pixel TB as a thermoelectric conversion unit.

A row select circuit 17 and a drive potential generation circuit 55 are provided on the outside of the imaging region 12. The row select circuit 17 and the drive potential generation circuit 55 are disposed along the column direction on one side of the row direction as viewed from the imaging region 12 in order to facilitate the connection with the row select lines 14. The row select circuit 17 is a circuit for selecting a row select line 14, and the drive potential generation circuit 55 is a circuit that applies a drive potential to the selected row select line 14. In view of this, hereinafter in this specification, when referring to a circuit that exhibits the combined function of the row select circuit 17 and the drive potential generation circuit 55, the row select circuit 17 and the drive potential generation circuit 55 are collectively referred to as a "drive circuit." Thus, the drive circuit selects a row select line 14 and applies a drive potential to the row select line 14.

The same number of load transistors 18 as the total number of vertical signal lines 15 and reference potential lines 20 are provided on one side of the column direction as viewed from the imaging region 12. The load transistors 18 are disposed to be related one-to-one to the vertical signal lines 15 and the reference potential line 20. Furthermore, one power source line 56 extending in the row direction and one power source signal line 57 extending in the row direction are provided on the same side as the load transistor 18 as viewed from the imaging region 12.

On the other hand, the same number of differential amplifiers 19 as the vertical signal lines 15 are provided on the other side of the column direction as viewed from the imaging region 12. The differential amplifiers 19 are disposed to be related one-to-one to the vertical signal lines 15. The differential amplifier 19 includes two input terminals and one output terminal.

One voltage follower circuit 23 is provided on the same side as the differential amplifier 19 as viewed from the imaging region 12. The voltage follower circuit 23 refers to an operational amplifier that generates an output potential equal to the input potential, and is a circuit capable of reducing the impedance while keeping the output potential equal to the input potential. The voltage follower circuit 23 includes two input terminals and one output terminal, and the negative input terminal is connected to the output terminal. Furthermore, the same number of horizontal select transistors 26 as the differential amplifiers 19 are provided on the same side as the differential amplifier 19 as viewed from the imaging region 12. The horizontal select transistors 26 are disposed to be related one-to-one to the differential amplifiers 19. In addition, a column select circuit 25 is provided on the same side as the differential amplifier 19 as viewed from the imaging region 12.

Next, the connection relationships among the components are described.

A plurality of infrared detection pixels IR disposed along each row select line 14 are connected to the row select line 14. That is, the anode of the p-n diode 16 of the infrared detection pixel IR is connected to the row select line 14. Furthermore, one non-sensitive pixel TB placed near each row select line 14 is connected to the row select line 14. That is, the anode of the p-n diode 16 of the non-sensitive pixel TB is connected to the row select line 14.

A plurality of infrared detection pixels IR disposed along each vertical signal line 15 are connected to the vertical signal line 15. That is, the cathode of the p-n diode 16 of the infrared detection pixel IR is connected to the vertical signal line 15. The plurality of non-sensitive pixels TB disposed along the reference potential line 20 are connected to the reference potential line 20. That is, the cathode of the p-n diode 16 of the non-sensitive pixel TB is connected to the reference potential line 20. One ends of all the row select lines 14 are connected to the row select circuit 17.

One end of each of the vertical signal lines 15 and the reference potential line 20 related to each load transistor 18 is connected to one of the source and the drain of the load transistor 18. Therefore, the cathode of the p-n diode 16 of the infrared detection pixel IR and the non-sensitive pixel TB is connected to one of the source and the drain of the load transistor 18 via the vertical signal line 15 and the reference potential line 20, respectively. The other of the source and the drain is connected to the power source line 56, and the gate of the load transistor 18 is connected to the power source signal line 57.

The other end of the reference potential line 20 is connected to the positive input terminal of the voltage follower circuit 23. An interconnection 24 is connected to the output terminal of the voltage follower circuit 23. The other end of the vertical signal line 15 is connected to the positive input terminal out of the two input terminals of the differential amplifier 19. The interconnection 24 is branched into the number of differential amplifiers 19, and each of the branched interconnections is connected to the negative input terminal out of the two input terminals of the differential amplifier. That is, the electric potential of the reference potential line 20 is inputted to the negative input terminal of each differential amplifier 19 via the voltage follower circuit 23 and the interconnection 24, and the electric potential of the vertical signal line 15 is inputted to the positive input terminal.

The output terminal of each differential amplifier 19 is connected to one of the source and the drain of the horizontal select transistor 26 related to the differential amplifier 19. The other of the source and the drain of the horizontal select transistor 26 is connected to an output terminal 60 of the solid state imaging device 1. The gate of the horizontal select transistor 26 is connected to the column select circuit 25.

For ease of illustration, in FIG. 1 the infrared detection pixel IR is shown only six in number. More specifically, infrared detection pixels IR are aligned two in number along the row direction and three in number along the column direction. Accordingly, the row select line 14 is shown only three in number, and the non-sensitive pixel TB is shown only three in number. On the other hand, the vertical signal line 15, the differential amplifier 19, and the horizontal select transistor 26 are each shown only two in number. However, in the actual solid state imaging device 1, more infrared detection pixels IR and more non-sensitive pixels TB are provided.

Next, the structures of the infrared detection pixel IR and the non-sensitive pixel TB according to the first embodiment are described.

Figure 2:
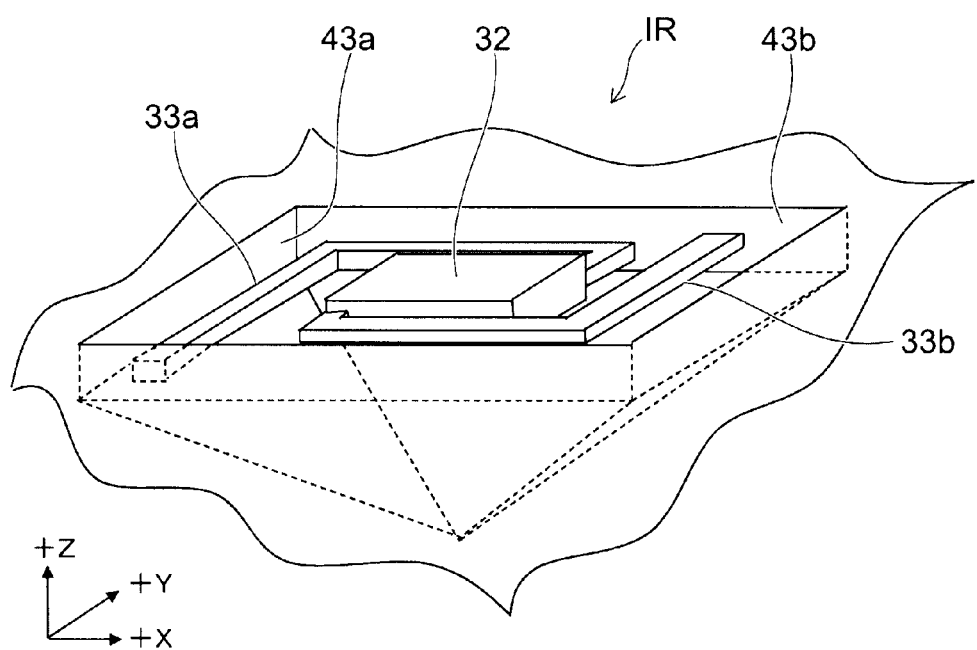
FIG. 2 is a perspective view illustrating an infrared detection pixel IR according to the first embodiment.

FIG. 2 is a perspective view illustrating the infrared detection pixel IR according to the first embodiment.

Figure 3A:
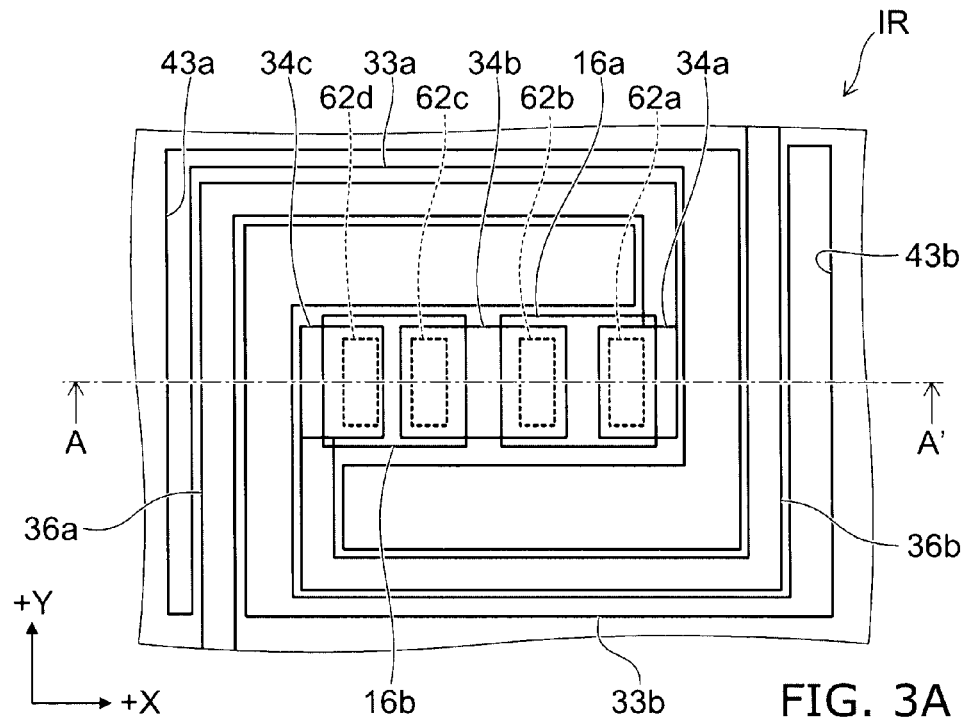
FIGS. 3A and 3B are a plan view and a cross-sectional view, respectively, illustrating the infrared detection pixel according to the first embodiment.
Figure 3B:
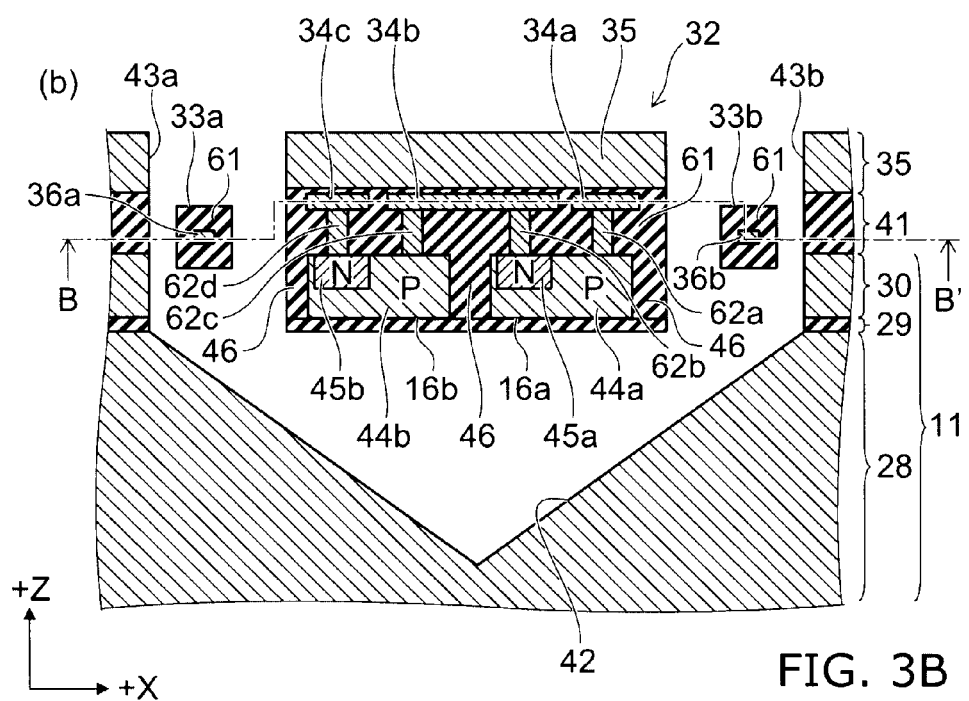

FIGS. 3A and 3B are a plan view and a cross-sectional view, respectively, illustrating the infrared detection pixel according to the first embodiment. FIG. 3A is a plan view by line B-B' shown in FIG. 3B, and FIG. 3B is a cross-sectional view taken along line A-A' shown in FIG. 3A.

As shown in FIGS. 3A and 3B, an SOI substrate is used as the semiconductor substrate 11. The SOI substrate refers to a substrate in which an insulative BOX layer 29 is provided on a support substrate 28 and a silicon layer 30 is provided on the BOX layer 29. The silicon layer 30 is formed of a single crystal of silicon. An interconnection layer 41 is provided on the semiconductor substrate 11, and an infrared absorption film 35 is provided on the interconnection layer 41. In the interconnection layer 41, contacts 62 and connection interconnections 34 are embedded in an insulating material 61.

A recess 42 in a shape of an inverted quadrangular pyramid is formed at the upper surface of the support substrate 28. In a region immediately above the recess 42, the BOX layer 29, the silicon layer 30, the interconnection layer 41, and the infrared absorption film 35 are selectively removed to form two spaces 43a and 43b (hereinafter, may be collectively referred to as "space 43"). As viewed from above, the remaining portions of the BOX layer 29, the silicon layer 30, the interconnection layer 41, and the infrared absorption film 35 in a region immediately above the recess 42 are in a rectangular shape, and are placed in a region inside the recess 42 and away from the outer edge of the recess 42. The remaining portions form a thermoelectric conversion unit 32 in a shape of substantially a rectangular parallelepiped.

In the silicon layer 30 of the thermoelectric conversion unit 32, two p-type regions 44a and 44b away from each other are formed, and n-type regions 45a and 45b are formed in parts of the upper portions of the p-type regions 44a and 44b, respectively. The p-type region 44a and the n-type region 45a form a p-n diode 16a, and the p-type region 44b and the n-type region 45b form a p-n diode 16b. An element isolation insulating film 46 is provided around the p-n diodes 16a and 16b (may be collectively referred to as "p-n diode 16").

In the interconnection layer 41 of the thermoelectric conversion unit 32, contacts 62a to 62d and connection interconnections 34a to 34c are provided in the insulating material 61. The contacts 62a to 62d are connected to the p-type region 44a, the n-type region 45a, the p-type region 44b, and the n-type region 45b, respectively. The connection interconnection 34a is connected to the contact 62a, the connection interconnection 34b is connected to the contacts 62b and 62c, and the connection interconnection 34c is connected to the contact 62d.

Hereinafter in this specification, to describe the infrared detection pixel IR and the non-sensitive pixel TB, an XYZ orthogonal coordinate system is used. In the XYZ orthogonal coordinate system, the direction from the p-type region 44b to the p-type region 44a is defined as a +X direction; the opposite direction thereto is defined as a −X direction; the upward direction perpendicular to the upper surface of the semiconductor substrate 11 is defined as a +Z direction; the downward direction is defined as a −Z direction; one of the directions orthogonal to both the +X direction and the +Z direction is defined as a +Y direction; and the opposite direction thereto is defined as a −Y direction. The X direction and the Y direction are in the same plane as the row direction and the column direction described above, and are defined independently from each other.

A support unit 33a formed of the interconnection layer 41 extends in the +Y direction from the end on the +X direction side of the thermoelectric conversion unit 32. The support unit 33a extends in the +Y direction from the end on the +X direction side of the side surface oriented toward the +Y direction of the thermoelectric conversion unit 32; then turns in the −X direction in a position that is in a region immediately above the recess 42 and is on the +X+Y direction side as viewed from the thermoelectric conversion unit 32; passes by the +Y direction side of the thermoelectric conversion unit 32; reaches a position that is in a region immediately above the recess 42 and is on the −X+Y direction side as viewed from the thermoelectric conversion unit 32; then turns in the −Y direction; passes by the −X direction side of the thermoelectric conversion unit 32; reaches the end edge of a region immediately above the recess 42; and is integrated with the interconnection layer 41 around the space 43. Thus, the support unit 33a turns twice and goes about halfway around the thermoelectric conversion unit 32. In the support unit 33a, a pixel interconnection 36a is provided along the longitudinal direction of the support unit 33a in the insulating material 61. The pixel interconnection 36a is formed integrally with the connection interconnection 34a.

On the other hand, a support unit 33b formed of the interconnection layer 41 extends in the −Y direction from the end on the −X direction side of the thermoelectric conversion unit 32. The support unit 33b extends in the −Y direction from the end on the −X direction side of the side surface oriented toward the −Y direction of the thermoelectric conversion unit 32; then turns in the +X direction in a position that is in a region immediately above the recess 42 and is on the −X−Y direction side as viewed from the thermoelectric conversion unit 32; passes by the −Y direction side of the thermoelectric conversion unit 32; reaches a position that is in a region immediately above the recess 42 and is on the +X−Y direction side as viewed from the thermoelectric conversion unit 32; then turns in the +Y direction; passes by the +X direction side of the thermoelectric conversion unit 32; reaches the end edge of a region immediately above the recess 42; and is integrated with the interconnection layer 41 around the space 43. Thus, the support unit 33b turns twice and goes about halfway around the thermoelectric conversion unit 32. In the support unit 33b, a pixel interconnection 36b is provided along the longitudinal direction of the support unit 33b in the insulating material 61. The pixel interconnection 36b is formed integrally with the connection interconnection 34c.

The support unit 33a and the support unit 33b are not in contact with each other. The portions other than both ends of the support units 33a and 33b are not in contact with any of the members including the interconnection layer 41 around the thermoelectric conversion unit 32 and the space 43. The thermoelectric conversion unit 32 is not in contact with any members other than the ends of the support units 33a and 33b. Thereby, the thermoelectric conversion unit 32 is supported only by the support units 33a and 33b in a region immediately above the recess 42. The support units 33a and 33b are configured to be in a long and narrow shape by going halfway around the thermoelectric conversion unit 32. On the other hand, as viewed from above, the spaces 43a and 43b make about one revolution around the thermoelectric conversion unit 32 in a spiral manner. Thus, in the infrared detection pixel IR, a hollow structure formed of the recess 42 and the spaces 43a and 43b is formed on the lower and lateral sides of the thermoelectric conversion unit 32.

The pixel interconnections 36a and 36b connect the anode of the p-n diode 16a of the thermoelectric conversion unit 32 to the row select line 14, and the cathode of the p-n diode 16b to the vertical signal line 15, respectively. Titanium nitride, for example, is given as the material of the pixel interconnections 36a and 36b.

Such a structure enables the infrared detection pixel IR to store the heat generated in accordance with incident infrared light and output an electric potential based on the heat to the vertical signal line 15. This is because forming the hollow structure can make it difficult for the heat of the thermoelectric conversion unit 32 to be transferred through the interior of the semiconductor substrate 11, the interconnection layer 41, and the infrared absorption film 35 and released to the surroundings.

The following is an example of the method for forming the recess 42. First, deep dry etching (deep RIE) is performed to remove the silicon layer 30 and the BOX layer 29 on the portions excluding the thermoelectric conversion unit 32 and the support units 33 of the surface of the semiconductor substrate 11. Thus, the spaces 43a and 43b are formed. After that, an etchant is injected through the spaces 43a and 43b to wet-etch the surface portion of the support substrate 28 to form the recess 42. In this embodiment, a silicon substrate in which the surface orientation is a (100) surface is used as the support substrate 28, and this is wet-etched to form the recess 42 in a shape of an inverted quadrangular pyramid convex downward. At this time, the BOX layer 29 serves as a barrier layer in the wet etching of the support substrate 28, and protects the silicon layer 30, in which the thermoelectric conversion unit 32 is provided, from wet etching.

The semiconductor substrate 11 is not limited to the SOI substrate. Semiconductor substrates 11 other than the SOI substrate may be used to the extent that the thermoelectric conversion unit 32 can be cross-linked by the support units 33 above the recess 42.

Next, the structure of the non-sensitive pixel TB is described.

Figure 4:
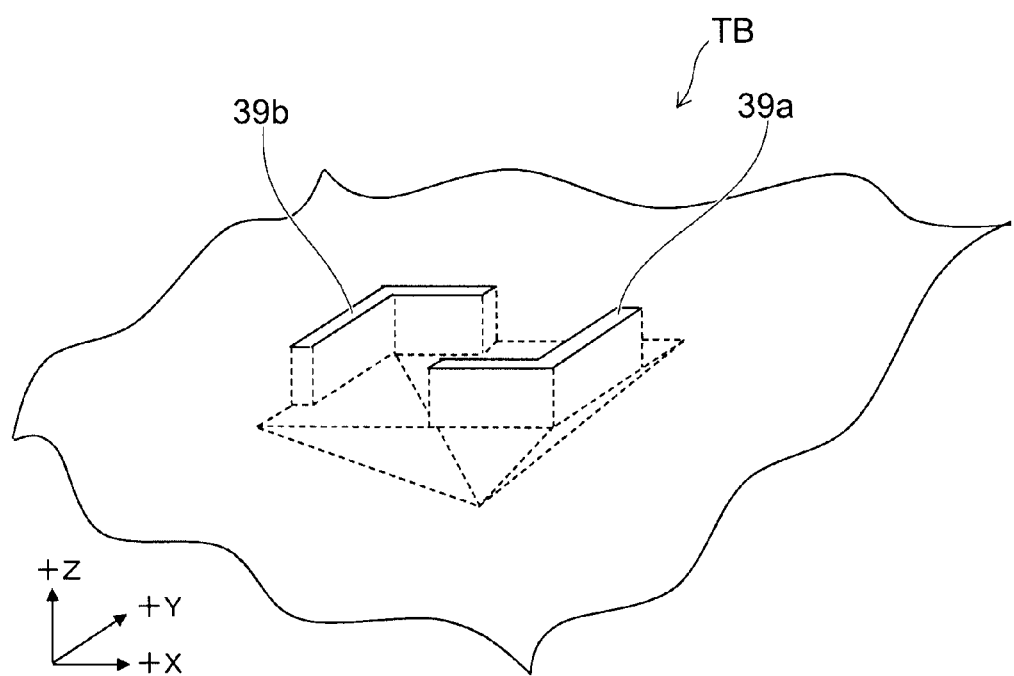
FIG. 4 is a perspective view illustrating a non-sensitive pixel according to the first embodiment.

FIG. 4 is a perspective view illustrating the non-sensitive pixel according to the first embodiment.

Figure 5A:
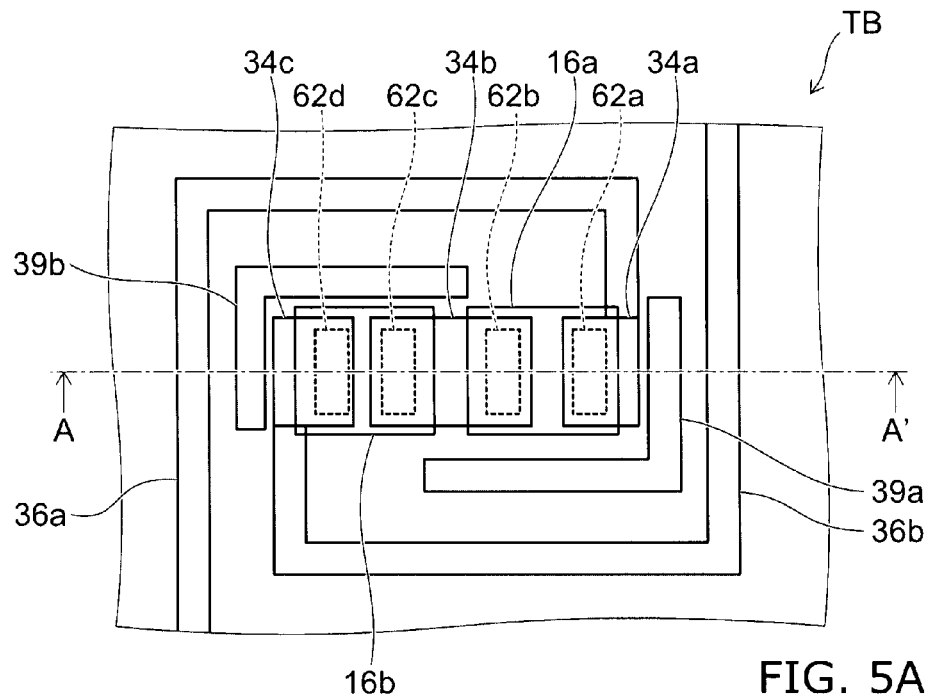
FIGS. 5A and 5B are a plan view and a cross-sectional view, respectively, illustrating the non-sensitive pixel according to the first embodiment.
Figure 5B:
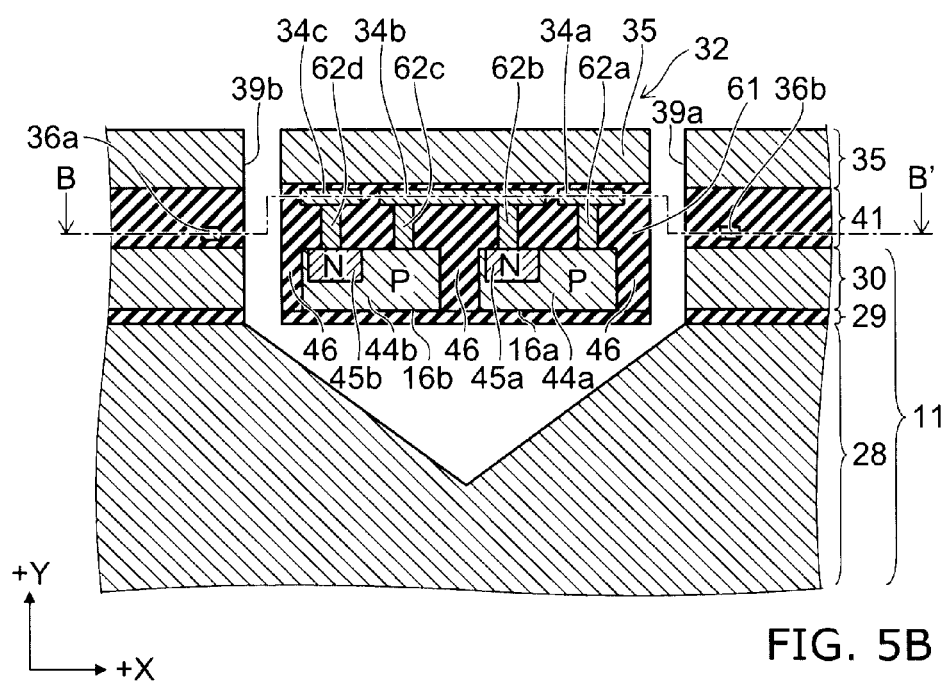

FIGS. 5A and 5B are a plan view and a cross-sectional view, respectively, illustrating the non-sensitive pixel according to the first embodiment. FIG. 5A is a plan view by line B-B' shown in FIG. 5B, and FIG. 5B is a cross-sectional view taken along line A-A' shown in FIG. 5A.

As shown in FIG. 4 and FIGS. 5A and 5B, the non-sensitive pixel TB differs from the infrared detection pixel IR described above in that the space 43 is not formed and trenches for etching 39a and 39b in two positions are formed. As viewed from above, the trench for etching 39a is in an L-shaped configuration along the end edge oriented toward the +X direction and the end edge oriented toward the −Y direction of the p-n diode 16a. The trench for etching 39b is in an L-shaped configuration along the end edge oriented toward the −X direction and the end edge oriented toward the +Y direction of the p-n diode 16b. As viewed from above (the +Z direction), the outer edge of the recess 42 coincides with the outer edges of the trenches for etching 39a and 39b, and is smaller than the recess 42 of the infrared detection pixel IR. Otherwise, the configuration of the non-sensitive pixel TB is similar to that of the infrared detection pixel IR.

The following is an example of the method for forming the recess 42 in the non-sensitive pixel TB.

First, the trenches for etching 39 are formed. The trenches for etching 39 are formed by using deep etching (deep RIE) to remove the silicon layer 30 and the BOX layer 29 from the surface of the semiconductor substrate 11. Here, the trench for etching 39 is formed in a position nearer to the p-n diode 16 than the space 43 is.

In this embodiment, in order that the recess 42 can be efficiently removed below the thermoelectric conversion unit 32, the trench for etching 39 is formed in two positions along mutually opposed corners of the thermoelectric conversion unit 32 as viewed from above. After that, an etchant is injected through the trenches for etching 39 to wet-etch the upper portion of the support substrate 28 immediately below the BOX layer 29 to form the recess 42.

In the infrared detection pixel IR, the thermoelectric conversion unit 32 is supported above the recess 42 only by the support units 33a and 33b. On the other hand, in the non-sensitive pixel TB, the thermoelectric conversion unit 32 is supported by all the portions excluding the trenches for etching 39a and 39b of the BOX layer 29, the silicon layer 30, the interconnection layer 41, and the infrared absorption film 35 located in a region immediately above the recess 42 (hereinafter, referred to as a "peripheral portion").

The purpose of providing the recess 42 also in the non-sensitive pixel TB is to make the characteristics of the p-n junction in the p-n diode 16 agree with those of the infrared detection pixel IR. By forming the recess 42, the p-n diode 16 is free from the interference of the electric field from the support substrate 28 made of silicon.

Therefore, the amount of conduction of the heat of the thermoelectric conversion unit 32 of the infrared detection pixel IR through the support units 33a and 33b to components other than the thermoelectric conversion unit is smaller than the amount of conduction of the heat of the thermoelectric conversion unit 32 of the non-sensitive pixel TB through the peripheral portion to components other than the thermoelectric conversion unit 32.

That is, the efficiency of the heat transfer between the thermoelectric conversion unit of the infrared detection pixel and the exterior of the infrared detection pixel is lower than the efficiency of the heat transfer between the thermoelectric conversion unit of the non-sensitive pixel and the exterior of the non-sensitive pixel. Herein, "the efficiency of the heat transfer between the thermoelectric conversion unit and the exterior of the pixel" refers to the efficiency with which the heat generated in the thermoelectric conversion unit is released to the exterior of the infrared detection pixel. For example, when a certain heat quantity is generated in the thermoelectric conversion unit, the efficiency mentioned above is calculated by the time required for a prescribed portion of the heat quantity to be transferred to the exterior of the infrared detection pixel. The shorter the time is, the higher the heat transfer efficiency is.

Therefore, the amount of change in the output potential when the infrared detection pixel IR receives infrared light is larger than the amount of change in the output potential when the non-sensitive pixel TB receives infrared light.

(Operations of the Solid State Imaging Device According to the First Embodiment)

Next, operations of the solid state imaging device according to the first embodiment are described.

As shown in FIG. 1, the drive circuit generates a bias potential $V_d$ as a drive potential. Then, the drive circuit sequentially selects one after another of the row select lines 14 to which the infrared detection pixel IR and the non-sensitive pixel TB are connected, and applies the bias potential $V_d$ to the infrared detection pixel IR and the non-sensitive pixel TB. The load transistors 18 to which the cathodes of the p-n diodes 16 of the infrared detection pixel IR and the non-sensitive pixel TB are connected are used as constant current sources. That is, the load transistor 18 is operated in a saturated area, and a constant current is supplied to the p-n diodes 16 of the infrared detection pixel IR and the non-sensitive pixel TB connected to the selected row select line 14 in accordance with the gate potential supplied to the gate electrode of the load transistor 18. The source potential of the load transistor 18 at this time is denoted by $V_{d0}$.

When the drive circuit applies the bias potential $V_d$ to the p-n diode 16 of the selected row select line 14, a series potential $(V_d-V_{d0})$ is applied to the p-n diode 16 of the selected row select line 14.

The not-selected row select line 14 is backward biased. Hence, the electric potential of the infrared detection pixel IR and the non-sensitive pixel TB connected to the not-selected row select line 14 is not reflected by the vertical signal line 15. That is, the p-n diode 16 takes the role of pixel selection.

In the infrared detection pixel IR, when the thermoelectric conversion unit 32 receives infrared light, the infrared light is converted into heat at the infrared absorption film 35, and the temperature of the thermoelectric conversion unit 32 increases. At this time, the thermoelectric conversion unit 32 is supported only by the support units 33a and 33b, and is almost heat-insulated from the surroundings. Therefore, the thermoelectric conversion unit 32 sensitively increases in temperature by receiving infrared light. In the infrared detection pixel IR on the selected row select line 14, the change in the electric potential due to the temperature increase of the thermoelectric conversion unit 32 is reflected by the vertical signal line 15.

In contrast, in the non-sensitive pixel TB, when the thermoelectric conversion unit 32 receives infrared light, the infrared light is converted into heat by the infrared absorption film 35; but since the thermoelectric conversion unit 32 is thermally connected to the surroundings via the peripheral portion, the converted heat is rapidly released from the thermoelectric conversion unit 32. Consequently, in the non-sensitive pixel TB, the thermoelectric conversion unit 32 hardly increases in temperature even upon receiving infrared light.

Figure 6:
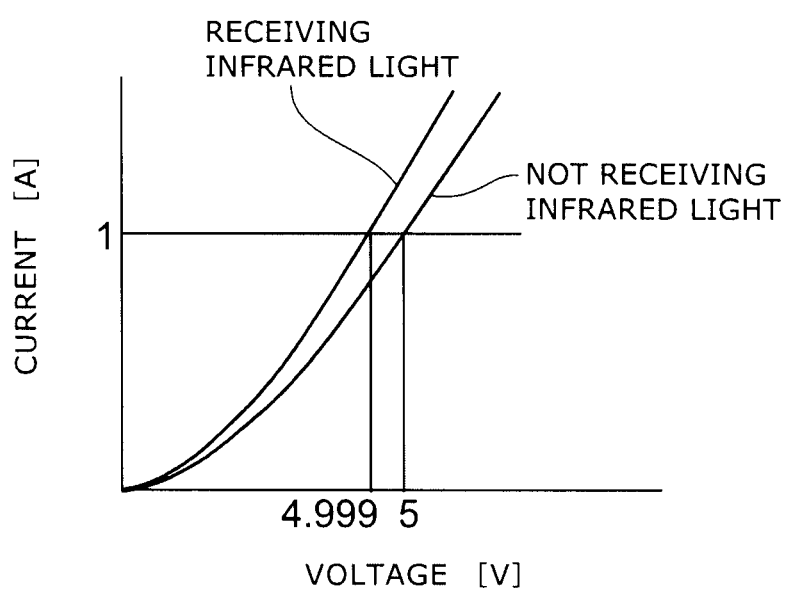
FIG. 6 is a graph illustrating a relationship between the electric potential and the current in the p-n diode of the thermoelectric conversion unit according to the first embodiment.

FIG. 6 is a graph illustrating the relationship between the electric potential and the current in the p-n diode of the thermoelectric conversion unit according to the first embodiment.

As shown in FIG. 6, this embodiment uses a region of forward characteristics for the relationship between the voltage and the current of the p-n diode 16, that is, a region exhibiting characteristics in which the current increases as the voltage supplied forward is increased. A constant current is passed through such a p-n diode 16 to measure the change in the electric potential.

As shown in FIG. 6, for example, it is assumed that the difference of the electric potential between the anode and the cathode of the p-n diode 16 when a current of one ampere ([A]) is passed as a constant current in a state of not receiving infrared light is five volts. When infrared light is incident on the infrared absorption film, the infrared absorption film 35 of the infrared detection pixel IR generates heat due to the incident infrared light. Hence, the I-V characteristics that the p-n diode exhibits change. As a consequence, under the condition that a constant current of one ampere is passed, the voltage between the anode and the cathode of the p-n diode 16 changes into, for example, 4.999 volts after the incidence of infrared light, as shown in FIG. 6. In this way, the p-n diode 16 in the thermoelectric conversion unit 32 converts the heat generated at the infrared absorption film 35 into an electric signal.

The electric potential at the vertical signal line 15 is $V_d-(V_{f0}-V_{sig})$, where $V_{f0}$ is the forward potential of the p-n diode at the time of not receiving infrared light, and $V_{sig}$ is the electric potential based on the temperature increase of the thermoelectric conversion unit 32 due to infrared light.

For example, if the temperature of the object changes by 1 K (kelvin), the temperature of the infrared detection pixel changes by approximately 5 mK. Assuming that the thermoelectric conversion efficiency is 10 mV/K, the difference of the electric potential between the anode and the cathode of the p-n diode decreases by 50 µV. Accordingly, the change in the electric potential at the vertical signal line 15 is $\{V_d-(V_{f0}-V_{sig})-(V_d-V_{f0})\}$; that is, the electric potential of the vertical signal line 15 increases by $V_{sig}$, i.e., approximately 50 µV.

The change in the electric potential caused at the vertical signal line 15 is inputted to one input terminal of the differential amplifier 19 via the vertical signal line 15.

The electric potential of the reference potential line 20 becomes the output potential $(V_d-V_{f0})$ of the non-sensitive pixel TB connected to the selected row select line 14. Here, since the design is made so that the forward potentials of the non-sensitive pixel TB and the infrared detection pixel IR at the time of not receiving infrared light may be equal, the $V_{f0}$ of them are the same. The electric potential of the reference potential line 20 of the non-sensitive pixel TB is impedance-converted by the voltage follower circuit 23, and the same electric potential is outputted and connected to the other input terminal of the differential amplifier 19.

In the differential amplifier 19, the difference $V_{sig}$ between the electric potentials inputted to the two terminals is amplified and outputted. The outputted electric potential is read out for each column for each horizontal select transistor 26 selected by the column select circuit 25. Then, the drive circuit sequentially selects row select lines 14 to repeat the operation described above, and the amount of change in the output potential due to receiving infrared light is read out for all the infrared detection pixels IR.

(Effects of the Solid State Imaging Device According to the First Embodiment)

Next, effects of the solid state imaging device according to the first embodiment are described.

The solid state imaging device according to this embodiment applies a bias potential to the infrared detection pixel IR and the non-sensitive pixel TB via the same row select line 14, inputs the output potential of the infrared detection pixel IR and the output potential of the non-sensitive pixel TB to the two input terminals of the differential amplifier 19, and outputs an electric potential corresponding to the difference. At this time, since the circuit from the non-sensitive pixel TB to the differential amplifier 19 is formed in the same semiconductor substrate as that of the infrared detection pixel IR, a single power source potential can be used. Thereby, the detection sensitivity of the solid state imaging device can be improved. Furthermore, since the circuit configuration can be simplified, noise can be reduced and the solid state imaging device can be downsized.

The recess 42 is provided not only in the infrared detection pixel IR but also in the non-sensitive pixel TB. Therefore, since the non-sensitive pixel TB is free from the interference of the electric field of the semiconductor substrate 11, the detection sensitivity of the solid state imaging device 1 can be improved.

Furthermore, by providing the infrared detection pixel IR and the non-sensitive pixel TB in an SOI substrate, the thermoelectric conversion unit 32 can be protected from etching in the formation of the recess 42. Therefore, the pixel can be formed with high accuracy and a solid state imaging device 1 with high sensitivity can be provided.

Moreover, since the p-n diode 16 is formed in a single crystal of silicon, there is a limited variation in the characteristics between p-n diodes 16. Furthermore, since carriers behave almost in accordance with the energy band diagram in the p-n diode 16 formed in a single crystal of silicon, the characteristics of the thermoelectric conversion unit can be accurately controlled. Also by this, the sensitivity of the solid state imaging device can be improved.

(Modification Example of the First Embodiment)

Next, a solid state imaging device according to a modification example of the first embodiment is described.

Figure 7:
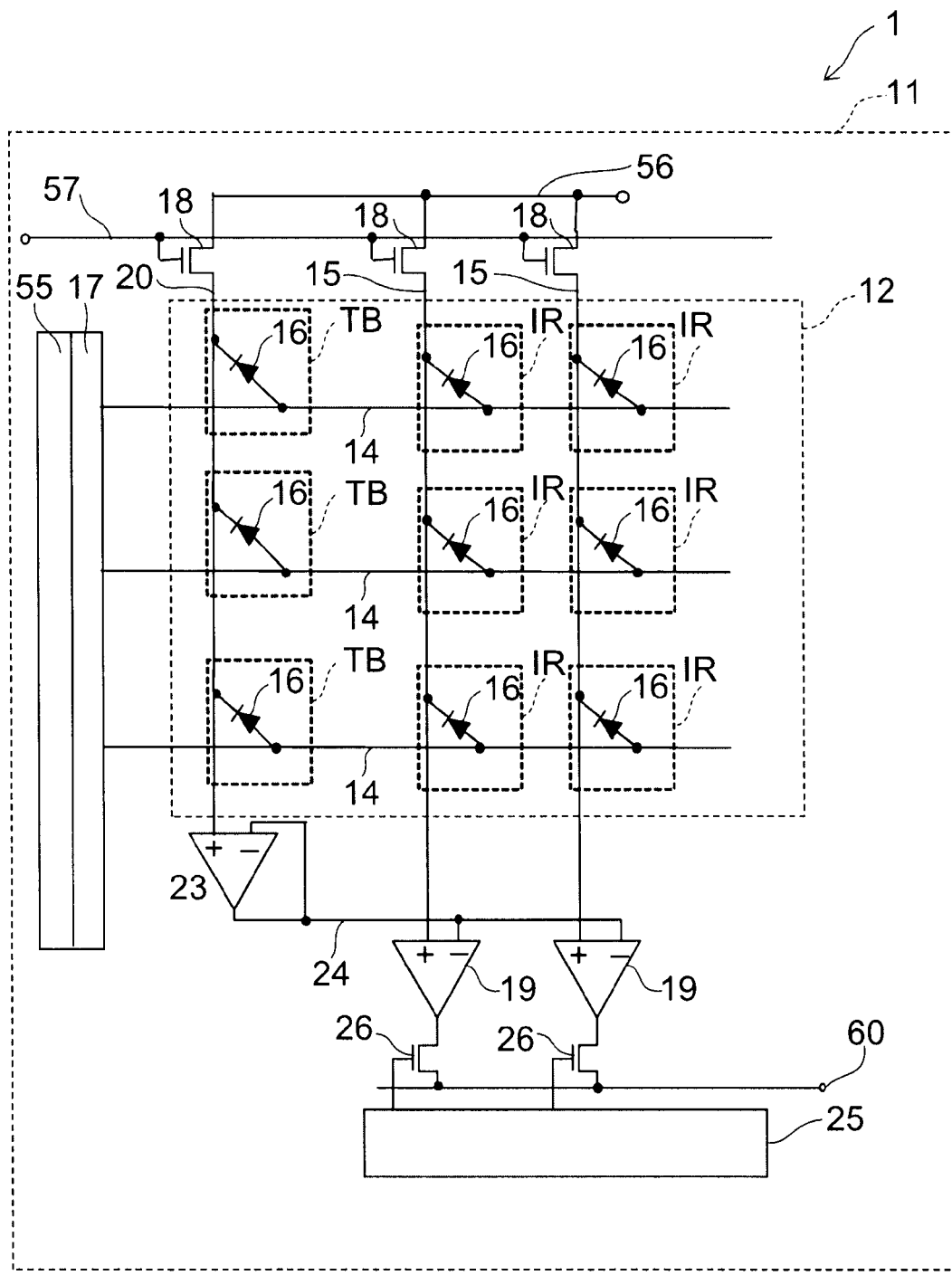
FIG. 7 is a circuit diagram illustrating a solid state imaging device according to a modification example of the first embodiment.

FIG. 7 is a circuit diagram illustrating a solid state imaging device according to a modification example of the first embodiment.

In the first embodiment, as shown in FIG. 1, the reference potential line 20 is provided farther from the drive circuit than the plurality of vertical signal lines 15 are.

As shown in FIG. 7, in this modification example, the reference potential line 20 is provided nearer to the drive circuit than the plurality of vertical signal lines 15 are. Otherwise, the configuration of this modification example is similar to that of the first embodiment. An electric potential corresponding to the difference between the output potentials of the infrared detection pixel IR and the non-sensitive pixel TB inputted to the respective two input terminals of the differential amplifier is outputted from the output terminal of the differential amplifier. Therefore, also in this modification example, a solid state imaging device 1 with high sensitivity can be obtained.

(Second Embodiment)

Next, a second embodiment is described.

In the solid state imaging device 1 according to the first embodiment, the output potential of the non-sensitive pixel TB is equally inputted to the differential amplifiers 19 for all the columns. However, since the forward current of the diode 16 flows through the row select line 14, the bias potential as a drive potential decreases in accordance with the interconnection resistance of the row select line 14. Consequently, the bias potential is higher in a column nearer to the drive circuit, and this causes shading of the bias potential. The shading results in the shading of the vertical signal lines 15. This means that the electric potential inputted from the vertical signal line 15 is different between the differential amplifiers 19 related to the vertical signal lines 15.

In the second embodiment, equivalent shading is produced also for the electric potential of the interconnection 24 for the non-sensitive pixel TB to make shading correction.

Figure 8:
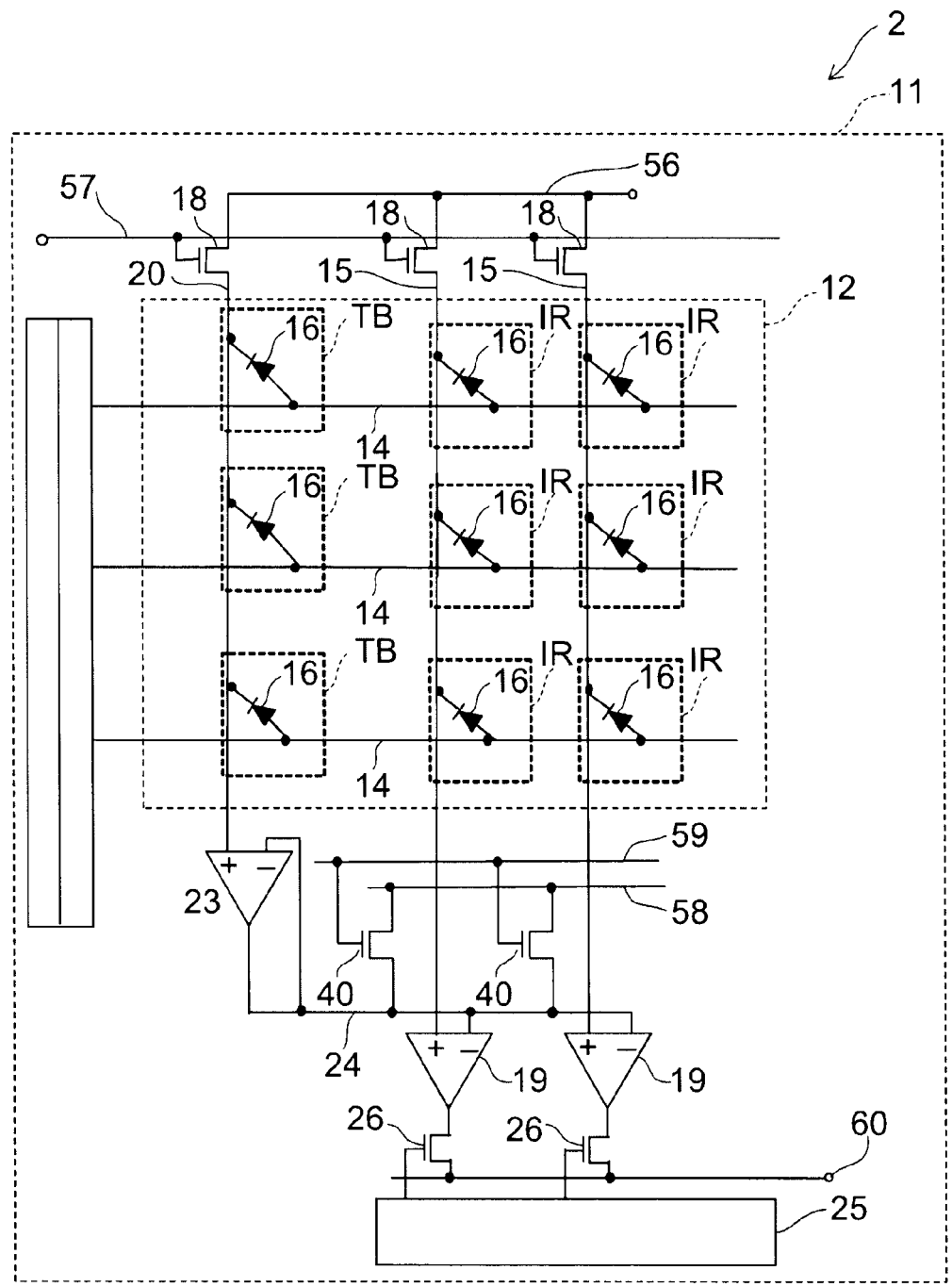
FIG. 8 is a circuit diagram illustrating a solid state imaging device according to a second embodiment.

FIG. 8 is a circuit diagram illustrating a solid state imaging device according to the second embodiment.

As shown in FIG. 8, a solid state imaging device 2 according to this embodiment is provided in the semiconductor substrate 11. The imaging region 12 is defined in the solid state imaging device 2.

In the imaging region 12, the plurality of row select lines 14 extending in the row direction (the first direction) and the plurality of vertical signal lines 15 extending in a direction intersecting with the row direction, for example the column direction (the second direction) orthogonal thereto, are provided in a lattice configuration. Furthermore, one reference potential line 20 extending in the column direction is provided in the imaging region 12. The reference potential line 20 is placed on the outside of the region where the plurality of vertical signal lines 15 described above are provided.

In this embodiment, the position where the drive circuit is placed is important. The drive circuit is placed on a side where there are no adjacent vertical signal lines 15 as viewed from the reference potential line 20. Second load transistors 40 are provided on the same side as the differential amplifier 19 outside the imaging region 12. The second load transistor 40 is provided equal in number to the vertical reference lines 15. A power source line 58 and a power source signal line 59 are provided on the same side as the differential amplifier 19 as viewed from the imaging region 12.

Next, the connection relationships among the components are described.

The interconnection 24 is connected to the output terminal of the voltage follower circuit 23. The interconnection 24 is connected to the other of the two input terminals of the differential amplifier 19 related to the vertical signal line 15 in a position corresponding to the length from the reference potential line 20 to the vertical signal line 15 on the row select line 14. One of the source and the drain of one load transistor 40 is connected individually to a portion of the interconnection 24 between the output terminal of the voltage follower circuit 23 and the input terminal of the differential amplifier 19 and a portion of the interconnection 24 between the input terminals of the differential amplifiers 19. The other of the source and the drain of the load transistor 40 is connected to the power source line 58. The gate of the load transistor 40 is connected to the power source signal line 59. The load transistor 40 operates in a saturated area, and supplies a constant current to the interconnection 24 connected thereto in accordance with the voltage of the gate thereof. In other words, the load transistor 40 acts as a constant current source. The source voltage of the load transistor 40 is denoted by $V_{d0}$.

The load transistor 40 has the same structure as the load transistor 18 used as the current source of the infrared detection pixel IR described above, and also the shapes and materials of both are the same. The power source line 58 is connected to the power source line 56, and the power source signal line 59 is connected to the power source signal line 57. Therefore, also the source voltage and the gate voltage applied to the load transistor 40 are equal to the source voltage and the gate voltage of the load transistor 18, respectively. The interconnection 24 is configured so that the resistance value per unit length thereof may be the same as the resistance value per unit length of the row select line 14. Otherwise, the configuration of this embodiment is similar to that of the first embodiment described above.

(Operations of the Solid State Imaging Device According to the Second Embodiment)

Next, operations of the solid state imaging device according to the second embodiment are described.

As shown in FIG. 8, the drive circuit sequentially selects one row after another of the infrared detection pixels IR via the row select line 14, and applies a bias potential to the infrared detection pixel IR. Thereby, the p-n diode 16 in the thermoelectric conversion unit 32 of the infrared detection pixel IR is forward biased. The forward bias current including the change in the electric potential due to the temperature increase of the infrared detection pixel IR flows through the vertical signal line 15.

The electric potential of the vertical signal line 15 is $\{V_d-(V_{f0}-V_{sig})\}$, where $V_{sig}$ is the change in the electric potential of the infrared detection pixel IR when infrared light is received. Herein, $V_{f0}$ is the p-n junction forward potential when no infrared light is received, and $V_{sig}$ is the change in the electric potential based on the temperature increase of the thermoelectric conversion unit 32 due to receiving infrared light.

In the second embodiment, since the forward current of the diode is passed through the row select line 14, a decrease in the bias potential occurs in accordance with the interconnection resistance of the row select line 14. That is, an electric potential of $(N-1)I_fR_0$ is added to the differential amplifier 19, and consequently an electric potential of $\{V_d-(V_{f0}-V_{sig})+(N-1)I_fR_0\}$ is inputted.

Herein, N is the number of columns of infrared detection pixels IR and non-sensitive pixels TB from the drive circuit, in other words, the total number of reference potential lines 20 and vertical signal lines 15; $I_f$ is a constant current; and $R_0$ is the resistance value of the row select line 14 between columns. When the spacings between the reference potential line 20 and the vertical signal lines 15 are equal, $I_fR_0$ corresponds to the fall of potential for one row, that is, the fall of potential between adjacent vertical signal lines 15 at the row select line 14.

In this way, the electric potential generated at the vertical signal line 15 is inputted to one input terminal of the differential amplifier 19 via the vertical signal line 15.

The electric potential of the reference potential line 20 of the non-sensitive pixel TB becomes $(V_d-V_{f0})$ at the time of selecting. Here, since the design is made so that the forward potentials of the non-sensitive pixel TB and the infrared detection pixel IR at the time of not receiving infrared light may be equal, the $V_{f0}$ of them are the same.

In the second embodiment, equivalent shading is produced also on the reference potential line 20 side to make shading correction. To this end, one load transistor 40 is connected to the interconnection 24 for each column, that is, for the length from the reference signal line 20 to the vertical signal line 15 or for each length between adjacent vertical signal lines 15. The load transistor 40 functions as a constant current source and supplies a constant current to the interconnection 24.

Therefore, since the resistance of the interconnection 24 is $R_0$ and a constant current $I_f$ flows through the interconnection 24, $\{(N-1)I_fR_0\}$ is added to the electric potential $(V_d-V_{f0})$ on the output side of the voltage follower circuit.

By such a configuration, a potential gradient exactly equivalent to that of the row select line 14 can be produced in the interconnection 24. Thus, the difference between the electric potentials inputted to the two input terminals of the differential amplifier 19 takes only one kind of value $V_{sig}$ for all the differential amplifiers 19.

(Effects of the Solid State Imaging Device According to the Second Embodiment)

Next, effects of the solid state imaging device according to the second embodiment are described.

By the configuration of the solid state imaging device according to the second embodiment, since a potential gradient equivalent to that of the row select line 14 can be produced in the interconnection 24, the difference between the electric potentials inputted to the two input terminals of the differential amplifier 19 takes only one kind of value $V_{sig}$ for all the differential amplifiers 19. Therefore, a solid state imaging element with suppressed shading and high detection sensitivity can be provided. Otherwise, the operations and effects of this embodiment are similar to those of the first embodiment described above.

(Third Embodiment)

Next, a third embodiment is described.

In the first and second embodiments, the non-sensitive pixels TB are disposed along the reference potential line 20. In contrast, in this embodiment, the non-sensitive pixels TB are disposed along the row select line 14. Furthermore, the non-sensitive pixel TB is connected to the vertical signal line 15 of the same column as the infrared detection pixel IR. Correlated double sampling circuits are provided to be related to the vertical signal lines 15.

Figure 9:
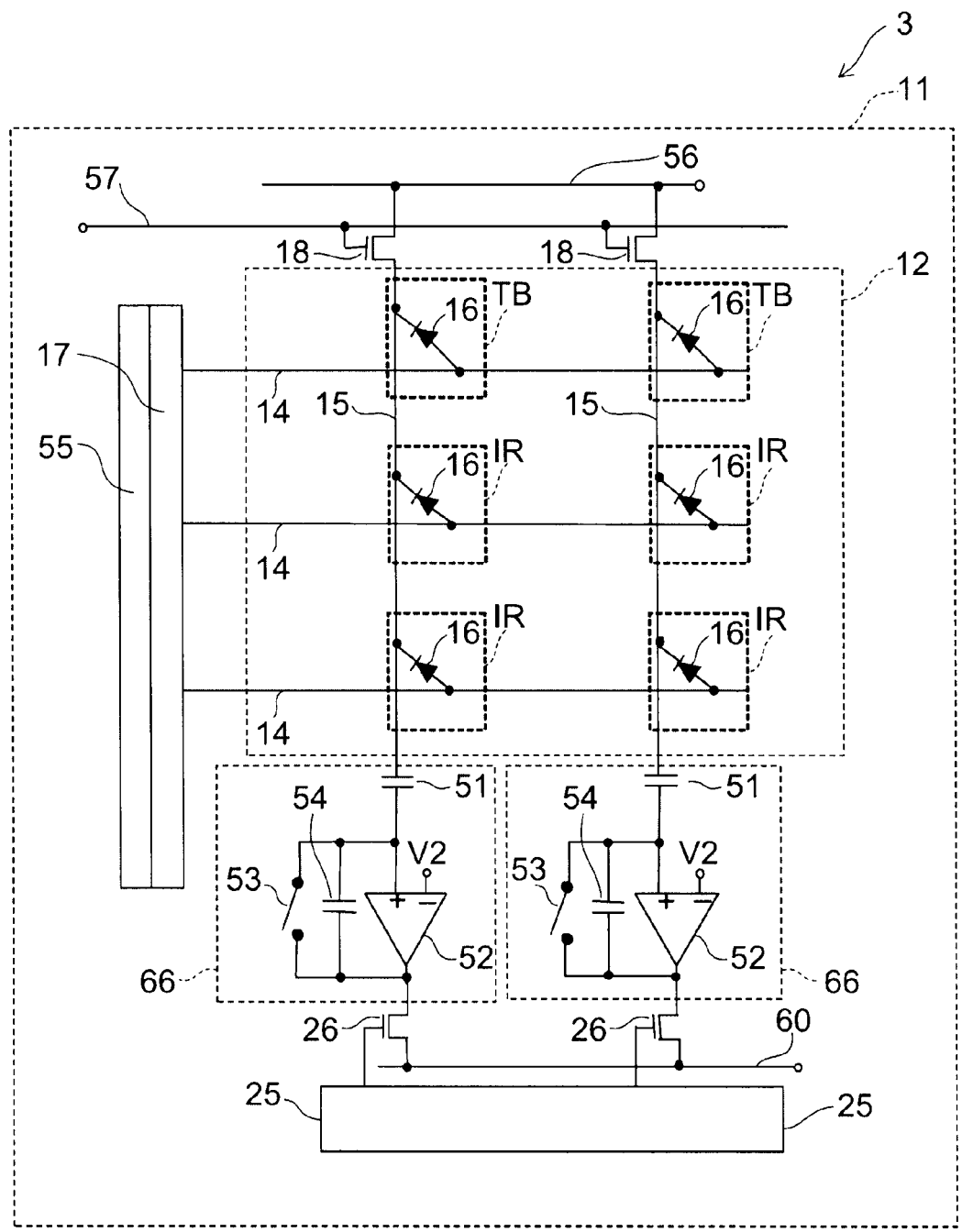
FIG. 9 is a circuit diagram illustrating a solid state imaging device according to a third embodiment.

FIG. 9 is a circuit diagram illustrating a solid state imaging device according to the third embodiment.

As shown in FIG. 9, a solid state imaging device 3 is provided in the semiconductor substrate 11. The imaging region 12 is defined in the solid state imaging device 3.

In the imaging region 12, the plurality of row select lines 14 extending in the row direction (the first direction) and the plurality of vertical signal lines 15 extending in a direction intersecting with the row direction, for example the column direction (the second direction) orthogonal thereto, are provided in a lattice configuration. In this embodiment, differing from the first and second embodiments described above, the reference potential line 20 is not provided.

The plurality of infrared detection pixels IR and the plurality of non-sensitive pixels TB are provided in the imaging region 12. The non-sensitive pixel TB is connected to the intersections of one row select line 14 and all the vertical signal lines 15. On the other hand, the infrared detection pixel IR is connected to the intersections of the other row select lines 14 and all the vertical signal lines 15. Thus, the infrared detection pixel IR and the non-sensitive pixel TB are connected to different row select lines 14.

The same number of load transistors 18 as the vertical signal lines 15 are provided on the outside of the imaging region 12. The load transistors 18 are disposed to be related one-to-one to the vertical signal lines 15.

Furthermore, the same number of correlated double sampling circuits 66 as the vertical signal lines 15 are provided on the opposite side to the load transistor 18 in the column direction outside the imaging region 12.

The correlated double sampling circuit 66 includes a coupling capacitance 51, a differential amplifier 52, a constant voltage power source V2, a feedback switch 53, and a feedback capacitance 54. The differential amplifier 52 includes two input terminals and one output terminal, and outputs an electric potential corresponding to the difference between the electric potentials inputted to the two input terminals from the output terminal.

Furthermore, the same number of horizontal select transistors 26 as the correlated double sampling circuits 66 are provided on the same side as the correlated double sampling circuit 66 in the column direction outside the imaging region 12. The horizontal select transistors 26 are disposed to be related one-to-one to the correlated double sampling circuits 66.

Next, the connection relationships of the solid state imaging device according to the third embodiment are described.

The other end of the vertical signal line 15 is connected to one end of the coupling capacitance 51 in the correlated double sampling circuit 66. The positive electrode of the differential amplifier 52 in the correlated double sampling circuit 66 is connected to the other end of the coupling capacitance 51. A constant electric potential V2 is applied to the negative electrode of the differential amplifier 52 in the correlated double sampling circuit 66. The feedback switch 53 and the feedback capacitance 54 in the correlated double sampling circuit 66 are connected in parallel. Both of one ends of the feedback switch 53 and the feedback capacitance 54 connected in parallel are connected to the positive electrode of the differential amplifier 52, and both of the other ends are connected to the output terminal of the differential amplifier 52.

The output terminal of the differential amplifier 52 in each correlated double sampling circuit 66 is connected to one of the source and the drain of the horizontal select transistor 26 related to the correlated double sampling circuit 66.

(Operations of the Solid State Imaging Device According to the Third Embodiment)

Next, operations of the solid state imaging device according to the third embodiment are described.

In this embodiment, the non-sensitive pixel TB and the infrared detection pixel IR are connected to different row select lines 14, and a drive potential is applied to the row select lines 14 at different times. Therefore, the output potential cannot be simultaneously compared between the non-sensitive pixel TB and the infrared detection pixel IR.

In view of this, a circuit is used that applies a drive potential to the non-sensitive pixel TB and the infrared detection pixel IR at different times, amplifies the difference between the output potentials of both pixels, and outputs the amplified difference.

First, in a first period, the bias potential $V_d$ as a drive potential is applied to the row select line 14 to which the non-sensitive pixel TB is connected. Consequently, the electric potential of the vertical signal line 15 becomes $(V_d-V_{f0})$. This potential value is herein assumed to be, for example, 1.0 V.

At this time, if the feedback switch 53 is switched to ON (short-circuited), the circuit composed of the differential amplifier 52 and the feedback switch 53 has a similar function to a voltage follower circuit. Therefore, the input potential and the output potential of the differential amplifier 52 become equal to the electric potential of the constant voltage power source V2. Herein, the constant potential V2 is a constant potential given to the differential amplifiers 52 for all the columns, and is assumed to be, for example, 1.5 V. At this time, the electric potential of one end of the coupling capacitance 51 to which the vertical signal line 15 is connected is 1.0 V, and the electric potential of the other end of the coupling capacitance 51 to which the differential amplifier 52 is connected is 1.5 V. Subsequently, if the feedback switch 52 is switched to OFF (open), the potential relationships mentioned above are kept.

Next, in a second period, the bias potential $V_d$ as a drive potential is applied to the row select line 14 to which the infrared detection pixel IR is connected. Consequently, the electric potential of the vertical signal line 15 becomes $V_d-(V_{f0}-V_{sig})$. This potential is assumed to be, for example, 1.001 V.

Therefore, since the potential difference between both ends of the coupling capacitance 51 is kept, the electric potential of one end of the coupling capacitance 51 to which the vertical signal line 15 is connected becomes higher than that in the first period by 0.001 V. Thereby, also the electric potential of the other end of the coupling capacitance 51 to which the differential amplifier 52 is connected becomes high, i.e., 1.501 V.

At this time, assuming that the gain of the differential amplifier 52 is sufficiently high, the correlated double sampling circuit 66 composed of the coupling capacitance 51, the differential amplifier 52, and the feedback capacitance 54 becomes an integration circuit. The electric potential outputted is $(C_c/C_{fb}) \cdot V_{sig}$, where $C_c$ is the capacitance value of the coupling capacitance 51, and $C_{fb}$ is the capacitance value of the feedback capacitance 54. For example, assuming that $C_c$ is 5 pF and $C_{fb}$ is 0.5 pF, the output potential is 0.01 V, which is obtained by $(5/0.5) \cdot 0.001$. Thus, the change $V_{sig}$ in the electric potential due to infrared absorption in the infrared detection pixel IR is amplified ten times.

(Effects of the Solid State Imaging Device According to the Third Embodiment)

Next, effects of the solid state imaging device according to the third embodiment are described.

Even in the case where the drive potential $V_d$ supplied to the diode is different between vertical signal lines due to the shading described in the second embodiment, the shading can be canceled in this embodiment because $V_d$ is not reflected by the output potential of the differential amplifier 52 at all.

Thus, a solid state imaging device with high sensitivity can be provided.

Although the p-n diode 16 is used as the thermoelectric conversion unit 32 in this embodiment, the thermoelectric conversion unit 32 may be formed by providing other members. As the other materials of the thermoelectric conversion unit, vanadium oxide, amorphous silicon, and amorphous silicon germanium are given. These materials have the feature of being excellent in sensitivity.

The embodiments described above can provide a solid state imaging device that can improve sensitivity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A solid state imaging device comprising:
an infrared detection pixel configured to change an output potential by receiving infrared light;
a non-sensitive pixel, an amount of change in an output potential when the non-sensitive pixel receives infrared light being smaller than an amount of change in an output potential when the infrared detection pixel receives the infrared light;
a row select line configured to apply a drive potential to both the infrared detection pixel and the non-sensitive pixel; and
a differential amplifier including one input terminal to which an output potential of the infrared detection pixel is inputted and another input terminal to which an output potential of the non-sensitive pixel is inputted and configured to output an electric potential corresponding to a difference between an electric potential inputted to the one input terminal and an electric potential inputted to the other input terminal, the infrared detection pixel, the non-sensitive pixel, and the differential amplifier being formed in a same semiconductor substrate.

2. The device according to claim 1, further comprising:

a vertical signal line connected to the infrared detection pixel;

a reference potential line connected to the non-sensitive pixel; and a first load transistor provided in the semiconductor substrate, provided equal in number to the total number of vertical signal lines and reference signal lines, connected individually to the vertical signal line and the reference signal line, and configured to pass a constant current, wherein output potentials of the infrared detection pixel and the non-sensitive pixel are inputted to the one input terminal and the other input terminal, respectively, of the differential amplifier via the vertical signal line and the reference potential line, respectively.

3. The device according to claim 2, wherein the row select line extends in a first direction and is provided plurally, the vertical signal line extends in a second direction intersecting with the first direction and is provided plurally, the reference potential line extends in the second direction, the infrared detection pixel and the non-sensitive pixel are each provided plurally, the differential amplifier is provided equal in number to the plurality of vertical signal lines and is related one-to-one to the plurality of vertical signal lines, the plurality of infrared detection pixels are connected individually between the plurality of row select lines and the plurality of vertical signal lines, the plurality of non-sensitive pixels are connected individually between the plurality of row select lines and the reference potential line, and the drive potential is sequentially applied to the infrared detection pixel and the non-sensitive pixel connected to the same row select line for each of the row select lines.

4. The device according to claim 3, further comprising:

a drive circuit provided in the semiconductor substrate and configured to apply the drive potential to the row select line;

a voltage follower circuit provided in the semiconductor substrate and including an input terminal connected to the reference potential line;

an interconnection provided in the semiconductor substrate and connected to an output terminal of the voltage follower circuit; and a plurality of second load transistors provided in the semiconductor substrate and configured to pass the constant current, one of a source and a drain of the second load transistor being connected to the interconnection, wherein the reference potential line is placed between the drive circuit and the vertical signal line, the interconnection is connected to the other input terminal of the differential amplifier related to the vertical signal line in a position corresponding to a length from the reference potential line to the vertical signal line on the row select line to allow an output potential of the non-sensitive pixel to be inputted to the differential amplifier, and the second load transistor is connected individually to a portion of the interconnection between an output terminal of the voltage follower circuit and an input terminal of the differential amplifier adjacent to the output terminal of the voltage follower circuit and a portion of the interconnection between adjacent input terminals of the differential amplifiers.

5. The device according to claim 4, wherein the first load transistor and the second load transistor include a gate, a source, and a drain, the drain of the first load transistor is connected individually to the vertical signal line and the reference potential line, the drain of the second load transistor is connected to the interconnection, a shape and a material are the same between the first load transistor and the second load transistor, a gate voltage supplied to the first load transistor and a gate voltage supplied to the second load transistor are equal to each other, and a source voltage supplied to the first load transistor and a source voltage supplied to the second load transistor are equal to each other.

6. The device according to claim 4, wherein a resistance value per unit length of the interconnection is the same as a resistance value per unit length of the row select line.

7. The device according to claim 1, further comprising a voltage follower circuit provided in the semiconductor substrate and configured to output an electric potential equal to an electric potential inputted, wherein an output potential of the non-sensitive pixel is inputted to another input terminal of the differential amplifier via the voltage follower circuit.

8. The device according to claim 1, wherein the semiconductor substrate includes a support substrate, an insulating layer provided on the support substrate, and a semiconductor layer provided on the insulating layer, a recess is formed in regions of an upper surface of the support substrate where the infrared detection pixel and the non-sensitive pixel are formed, a thermoelectric conversion unit formed of the semiconductor layer, an interconnection layer provided on the semiconductor layer, and an infrared absorption film provided on the interconnection layer and configured to generate heat by absorbing infrared light and placed in a region immediately above the recess, electrical characteristics of which change by receiving infrared light, is formed in the infrared detection pixel and the non-sensitive pixel, portions around the thermoelectric conversion unit of the semiconductor layer, the interconnection layer, and the infrared absorption film are selectively removed, and an efficiency of heat transfer between the thermoelectric conversion unit of the infrared detection pixel and an exterior of the infrared detection pixel is lower than an efficiency of heat transfer between the thermoelectric conversion unit of the non-sensitive pixel and an exterior of the non-sensitive pixel.

9. The device according to claim 8, wherein an outer edge of the recess in the infrared detection pixel is larger than an outer edge of the recess in the non-sensitive pixel.

10. The device according to claim 8, wherein a pair of support units formed of the interconnection layer and supporting the thermoelectric conversion unit in a region immediately above the recess are formed around the thermoelectric conversion unit in the infrared detection pixel, one of the support units extends from one end of the thermoelectric conversion unit, goes halfway around the thermoelectric conversion unit along a prescribed revolution direction, and reaches an outer edge of a region immediately above the recess, and another of the support units extends from another end of the thermoelectric conversion unit, goes halfway around the thermoelectric conversion unit along the prescribed revolution direction, and reaches an outer edge of a region immediately above the recess.

11. The device according to claim 10, wherein a pixel interconnection connecting the row select line to the thermoelectric conversion unit is provided in the support unit.

12. The device according to claim 8, wherein a p-n diode is formed in the semiconductor layer forming the thermoelectric conversion unit.

13. A solid state imaging device comprising:
an infrared detection pixel configured to change an output potential by receiving infrared light;
a non-sensitive pixel, an amount of change in an output potential when the non-sensitive pixel receives infrared light being smaller than an amount of change in an output potential when the infrared detection pixel receives the infrared light;
a first row select line connected to the non-sensitive pixel and configured to apply a drive voltage to the non-sensitive pixel;
a second row select line connected to the infrared detection pixel and configured to apply a drive potential to the infrared detection pixel;
a drive circuit provided on a semiconductor substrate and configured to sequentially select the first and second row select lines to apply the drive potential;
a vertical signal line connected to both the infrared detection pixel and the non-sensitive pixel;
a first load transistor provided in the semiconductor substrate, connected to one end of the vertical signal line, and configured to pass a constant current; and
a correlated double sampling circuit connected to another end of the vertical signal line and configured to keep a first potential inputted when the first row select line is selected and to output an electric potential corresponding to a difference between the first potential and a second potential inputted when the second row select line is selected,
the infrared detection pixel, the non-sensitive pixel, and the correlated double sampling circuit being formed in the same semiconductor substrate.

14. The device according to claim 13, wherein
the first row select line extends in a first direction,
the second row select line extends in the first direction and is provided plurally,
the vertical signal line extends in a second direction intersecting with the first direction and is provided plurally,
the infrared detection pixel and the non-sensitive pixel are each provided plurally,
the first load transistor is provided equal in number to the vertical signal lines and is connected one-to-one to the vertical signal lines,
the correlated double sampling circuit is provided equal in number to the plurality of vertical signal lines, is related one-to-one to the plurality of vertical signal lines, and is connected to the vertical signal line related,
the plurality of infrared detection pixels are connected individually between the plurality of second row select lines and the plurality of vertical signal lines, and
the plurality of non-sensitive pixels are connected individually between the first row select line and the plurality of vertical signal lines.

15. The device according to claim 13, wherein
the correlated double sampling circuit includes:
a differential amplifier including one and another input terminals and one output terminal and configured to output an electric potential corresponding to a difference between electric potentials inputted to the one and other input terminals;
a coupling capacitance including one end connected to the vertical signal line and another end connected to one input terminal of the differential amplifier;
a feedback switch including one end connected to one input terminal of the differential amplifier and another end connected to an output terminal of the differential amplifier; and
a feedback capacitance including one end connected to one input terminal of the differential amplifier and another end connected to an output terminal of the differential amplifier and
a constant current is inputted to the other input terminal of the differential amplifier.

16. The device according to claim 13, wherein
the semiconductor substrate includes a support substrate, an insulating layer provided on the support substrate, and a semiconductor layer provided on the insulating layer,
a recess is formed in regions of an upper surface of the support substrate where the infrared detection pixel and the non-sensitive pixel are formed,
a thermoelectric conversion unit formed of the semiconductor layer, an interconnection layer provided on the semiconductor layer, and an infrared absorption film provided on the interconnection layer and configured to generate heat by absorbing infrared light and placed in a region immediately above the recess, electrical characteristics of which change by receiving infrared light, is formed in the infrared detection pixel and the non-sensitive pixel,
portions around the thermoelectric conversion unit of the semiconductor layer, the interconnection layer, and the infrared absorption film are selectively removed, and
an efficiency of heat transfer between the thermoelectric conversion unit of the infrared detection pixel and an exterior of the infrared detection pixel is lower than an efficiency of heat transfer between the thermoelectric conversion unit of the non-sensitive pixel and an exterior of the non-sensitive pixel.

17. The device according to claim 16, wherein an outer edge of the recess in the infrared detection pixel is larger than an outer edge of the recess in the non-sensitive pixel.

18. The device according to claim 16, wherein
a pair of support units formed of the interconnection layer and supporting the thermoelectric conversion unit in a region immediately above the recess are formed around the thermoelectric conversion unit in the infrared detection pixel,
one of the support units extends from one end of the thermoelectric conversion unit, goes halfway around the thermoelectric conversion unit along a prescribed revolution direction, and reaches an outer edge of a region immediately above the recess, and
another of the support units extends from another end of the thermoelectric conversion unit, goes halfway around the thermoelectric conversion unit along the prescribed revolution direction, and reaches an outer edge of a region immediately above the recess.

19. The device according to claim 18, wherein a pixel interconnection connecting the row select line to the thermoelectric conversion unit is provided in the support unit.

20. The device according to claim 16, wherein a p-n diode is formed in the semiconductor layer forming the thermoelectric conversion unit.

* * * * *